(12) United States Patent
Essenmacher

(10) Patent No.: US 9,702,419 B2
(45) Date of Patent: Jul. 11, 2017

(54) ELECTROMECHANICAL SYSTEM FOR CONTROLLING THE OPERATING MODE OF A SELECTABLE CLUTCH ASSEMBLY AND OVERRUNNING COUPLING AND ELECTROMECHANICAL CONTROL ASSEMBLY USING THE SYSTEM

(71) Applicant: Means Industries, Inc., Saginaw, MI (US)

(72) Inventor: Ryan W. Essenmacher, Saginaw, MI (US)

(73) Assignee: Means Industries, Inc., Saginaw, MI (US)

( * ) Notice: Subject to any disclaimer, the term of this patent is extended or adjusted under 35 U.S.C. 154(b) by 54 days.

(21) Appl. No.: 14/933,345

(22) Filed: Nov. 5, 2015

(65) Prior Publication Data

US 2016/0131205 A1 May 12, 2016

Related U.S. Application Data

(60) Provisional application No. 62/076,646, filed on Nov. 7, 2014.

(51) Int. Cl.
*F16D 41/14* (2006.01)
*F16D 41/12* (2006.01)
(Continued)

(52) U.S. Cl.
CPC .......... *F16D 41/125* (2013.01); *F16D 23/12* (2013.01); *F16D 28/00* (2013.01); *F16D 41/14* (2013.01);
(Continued)

(58) Field of Classification Search
CPC Y10T 477/75; Y10T 477/76; B60W 50/0205; B60W 50/035; F16D 23/12;
(Continued)

(56) References Cited

U.S. PATENT DOCUMENTS 2,947,537 A 8/1960 Littell et al.
2,959,062 A 11/1960 Looker
(Continued)

OTHER PUBLICATIONS

International Search Report and Written Opinion, International appln No. PCT/US2016/061488, mailing date: Jan. 19, 2017.
(Continued)

*Primary Examiner* — Roger Pang
(74) *Attorney, Agent, or Firm* — Brooks Kushman P.C.

(57) ABSTRACT

An electromechanical system for controlling the operating mode of a selectable clutch assembly and an overrunning coupling and electromechanical control assembly are provided. The system includes a control member mounted for controlled movement and a bi-directional, electrically-powered, actuator assembly coupled to the control member for selective, small-displacement, control member movement between different positions which correspond to different modes of the clutch assembly. The actuator assembly holds the control member in a desired one of the positions after electrical power to the actuator assembly has been purposefully terminated. Control logic is operative to determine a system failure and to generate a failsafe position command signal in the event of the system failure. The actuator assembly moves the control member to a failsafe position based on the failsafe position command signal to prevent inadvertent engagement of the clutch assembly.

27 Claims, 9 Drawing Sheets

(51) Int. Cl.
*F16D 23/12* (2006.01)
*F16D 28/00* (2006.01)
*B60W 50/02* (2012.01)
*B60W 50/035* (2012.01)
*F16D 48/10* (2006.01)

(52) U.S. Cl.
CPC ....... *B60W 50/0205* (2013.01); *B60W 50/035* (2013.01); *F16D 48/10* (2013.01); *Y10T 477/75* (2015.01); *Y10T 477/76* (2015.01)

(58) Field of Classification Search
CPC ........ F16D 28/00; F16D 41/14; F16D 41/125; F16D 48/10
USPC .............................................. 701/68; 477/906
See application file for complete search history.

(56) References Cited

U.S. PATENT DOCUMENTS

| | | | |
|---|---|---|---|
| 4,050,560 A | 9/1977 | Torstenfelt | |
| 4,340,133 A | 7/1982 | Blersch | |
| 4,651,847 A | 3/1987 | Hermanns | |
| 5,043,892 A | 8/1991 | Brekkestran et al. | |
| 5,461,935 A | 10/1995 | Hill | |
| 5,678,671 A * | 10/1997 | Leimbach | B60T 13/745 192/114 R |
| 5,927,455 A | 7/1999 | Baker et al. | |
| 6,193,038 B1 | 2/2001 | Scott et al. | |
| 6,244,965 B1 | 6/2001 | Klecker et al. | |
| 6,290,044 B1 | 9/2001 | Burgman et al. | |
| 6,307,376 B1 | 10/2001 | Alexander et al. | |
| 6,568,517 B2 | 5/2003 | Le-Calve et al. | |
| 6,607,292 B2 | 8/2003 | Gutierrez et al. | |
| 6,679,362 B2 | 1/2004 | Berger et al. | |
| 6,905,009 B2 | 6/2005 | Reed et al. | |
| 7,044,263 B2 | 5/2006 | Fischbach et al. | |
| 7,198,587 B2 | 4/2007 | Samie et al. | |
| 7,258,214 B2 | 8/2007 | Pawley et al. | |
| 7,275,628 B2 | 10/2007 | Pawley et al. | |
| 7,344,010 B2 | 3/2008 | Fetting, Jr. et al. | |
| 7,464,801 B2 | 12/2008 | Wittkopp | |
| 7,484,605 B2 | 2/2009 | Pawley et al. | |
| 7,491,151 B2 | 2/2009 | Maguire et al. | |
| 7,743,678 B2 | 6/2010 | Wittkopp et al. | |
| 7,766,790 B2 | 8/2010 | Stevenson et al. | |
| 7,814,806 B2 * | 10/2010 | DeVore | F16H 59/70 477/906 |
| 7,942,781 B2 | 5/2011 | Kimes | |
| 7,992,695 B2 | 8/2011 | Wittkopp et al. | |
| 8,051,959 B2 | 11/2011 | Eisengruber | |
| 8,061,496 B2 | 11/2011 | Samie et al. | |
| 8,079,453 B2 | 12/2011 | Kimes | |
| 8,272,488 B2 | 9/2012 | Eisengruber et al. | |
| 8,276,725 B2 | 10/2012 | Swales et al. | |
| 8,286,772 B2 | 10/2012 | Eisengruber | |
| 8,324,890 B2 | 12/2012 | Lin | |
| 8,406,974 B2 * | 3/2013 | Holland | F16H 61/2807 701/58 |
| 8,540,065 B2 | 9/2013 | Samie et al. | |
| 8,602,187 B2 | 12/2013 | Prout | |
| 2004/0238306 A1 | 12/2004 | Reed et al. | |
| 2005/0189190 A1 | 9/2005 | Kowalsky et al. | |
| 2006/0185957 A1 | 8/2006 | Kimes et al. | |
| 2007/0034470 A1 | 2/2007 | Fetting, Jr. et al. | |
| 2007/0278061 A1 | 12/2007 | Wittkopp et al. | |
| 2008/0110715 A1 | 5/2008 | Pawley | |
| 2008/0169165 A1 | 7/2008 | Samie et al. | |
| 2008/0169166 A1 | 7/2008 | Wittkopp et al. | |
| 2008/0185253 A1 | 8/2008 | Kimes | |
| 2008/0223681 A1 | 9/2008 | Stevenson et al. | |
| 2009/0159391 A1 | 6/2009 | Eisengruber | |
| 2009/0194381 A1 | 8/2009 | Samie et al. | |
| 2009/0211863 A1 | 8/2009 | Kimes | |
| 2009/0255773 A1 | 10/2009 | Seufert et al. | |
| 2010/0022342 A1 | 1/2010 | Samie et al. | |
| 2010/0230226 A1 | 9/2010 | Prout | |
| 2010/0252384 A1 | 10/2010 | Eisengruber | |
| 2010/0255954 A1 | 10/2010 | Samie et al. | |
| 2011/0068775 A1 | 3/2011 | Lin | |
| 2011/0177900 A1 | 7/2011 | Simon | |
| 2011/0183806 A1 | 7/2011 | Wittkopp et al. | |
| 2011/0192697 A1 | 8/2011 | Prout et al. | |
| 2012/0090952 A1 | 4/2012 | Lee et al. | |
| 2012/0145506 A1 | 6/2012 | Samie et al. | |
| 2012/0152683 A1 | 6/2012 | Kimes | |
| 2012/0152687 A1 | 6/2012 | Kimes et al. | |
| 2012/0231913 A1 | 9/2012 | Samie et al. | |
| 2013/0151100 A1 * | 6/2013 | Lee | F16D 28/00 701/68 |
| 2013/0199885 A1 | 8/2013 | Quehenberger et al. | |
| 2013/0256078 A1 | 10/2013 | Kimes et al. | |
| 2014/0190785 A1 | 7/2014 | Fetting et al. | |
| 2016/0129864 A1 * | 5/2016 | Essenmacher | F16D 27/14 307/9.1 |
| 2016/0332636 A1 * | 11/2016 | Iida | B60W 50/035 |
| 2016/0369855 A1 * | 12/2016 | Essenmacher | F16D 48/064 |
| 2016/0377126 A1 * | 12/2016 | Essenmacher | F16D 27/02 192/84.6 |

OTHER PUBLICATIONS

International Search Report and Written Opinion, International appln No. PCT/US2016/062459, mailing date: Jan. 31, 2017.

* cited by examiner

ELECTROMECHANICAL SYSTEM FOR CONTROLLING THE OPERATING MODE OF A SELECTABLE CLUTCH ASSEMBLY AND OVERRUNNING COUPLING AND ELECTROMECHANICAL CONTROL ASSEMBLY USING THE SYSTEM

CROSS REFERENCE TO RELATED APPLICATION

This application claims the benefit of U.S. provisional application Ser. No. 62/076,646 filed Nov. 7, 2014.

TECHNICAL FIELD

At least one embodiment of the invention generally relates to systems for controlling the operating mode of a selectable clutch assembly and, in particular, to electromechanical systems for controlling the operating mode of such assemblies.

OVERVIEW

A typical one-way clutch (i.e., OWC) includes a first coupling member, a second coupling member, and a first set of locking members between opposing surfaces of the two coupling members. The one-way clutch is designed to lock in one direction and to allow free rotation in the opposite direction. Two types of one-way clutches often used in vehicular, automatic transmissions include:

- roller type which includes spring-loaded rollers between inner and outer races of the one-way clutch. (Roller type is also used without springs on some applications); and
- sprag type which includes asymmetrically shaped wedges located between inner and outer races of the one-way clutch.

One way clutches typically over run during engine braking rather than enable engine braking. It is for this reason there is a friction pack at the same transmission node. Selectable dynamic clutches can be used to prevent the over running condition and enable engine braking.

Controllable or selectable one-way clutches (i.e., OWCs) are a departure from traditional one-way clutch designs. Selectable OWCs often add a second set of struts or locking members in combination with a slide plate. The additional set of locking members plus the slide plate adds multiple functions to the OWC. Depending on the needs of the design, controllable OWCs are capable of producing a mechanical connection between rotating or stationary shafts in one or both directions. Also, depending on the design, OWCs are capable of overrunning in one or both directions. A controllable OWC contains an externally controlled selection or actuation mechanism. Movement of this selection mechanism can be between two or more positions which correspond to different operating modes. The selection mechanism is a separate system or assembly that is fixed relative to the OWC by same fastening technique. Such selection mechanism is fixed in a separate and subsequent operation after the OWC has been formed. That subsequent operation requires an additional work station, be it automated or otherwise, which increases, in particular, the manufacturing time and cost of the finished assembly.

In addition, the fact that separate, external parts may be mounted on or near the OWC is a source of quality defects and thus adds to the cost of making such controllable or selectable OWC's which may be significant on a mass production basis. Also, due to dimensional stack-up issues control element or selector plate binding can result especially over long term use.

Driven by a growing demand by industry, governmental regulatory agencies and consumers for durable and inexpensive products that are functionally comparable or superior to prior art products, a continuing need exists for improvements in clutches subjected to difficult service conditions such as extreme temperatures. This is particularly true in the automotive industry where developers and manufacturers of clutches for automotive applications must meet a number of competing performance specifications for such articles.

Another problem associated with prior art coupling and control assemblies is that it is undesirable to have a relatively large distance between the control element and the activator which moves the control element. A large distance reduces the amount of available space in which the assembly is located. For example, in a vehicle, the amount of space for such assemblies is typically quite limited.

U.S. Pat. No. 5,927,455 discloses a bi-directional overrunning pawl-type clutch. U.S. Pat. No. 6,244,965 discloses a planar overrunning coupling for transfer of torque. U.S. Pat. No. 6,290,044 discloses a selectable one-way clutch assembly for use in an automatic transmission. U.S. Pat. No. 7,258,214 discloses an overrunning coupling assembly. U.S. Pat. No. 7,344,010 discloses an overrunning coupling assembly. U.S. Pat. No. 7,484,605 discloses an overrunning radial coupling assembly or clutch.

Other related U.S. patent publications include 2012/0145506; 2011/0192697; 2011/0183806; 2010/0252384; 2009/0194381; 2008/0223681; 2008/0169165; 2008/0169166; 2008/0185253; and the following U.S. Pat. Nos. 8,079,453; 7,992,695; 8,051,959; 7,766,790; 7,743,678; and 7,491,151.

U.S. Pat. No. 8,272,488 discloses in its FIGS. 9a-9c (labeled as FIGS. 1a-1c, respectively, in this application), a "perpendicular actuating shift valve" latching mechanism, generally indicated at 500. A control plate or element 502 of a one-way clutch is provided which shifts or slides along a shift direction between pocket and recess plates (not shown) of the clutch to controllably cover and uncover struts 504 which are spring-biased within the pocket plate. A free end portion 506 of an actuating arm or pin, generally indicated at 508, may move within a curved pin recess or groove 510 formed in an outer surface 528 of a valve or piston, generally indicated at 512, in a direction substantially perpendicular to a shift direction of the control plate 502 during sliding movement of the piston or valve 512 within a bore 513 formed in a housing 514. The side walls or surfaces of the grooves 510 lock the pin 508 therebetween as shown in FIG. 1a to prevent movement of the pin 508 in a direction parallel to the shift direction of the control plate 502. The groove 510 may be curved and the free end portion 506 of the actuating arm 508 may simultaneously move within the groove 510 in both a direction substantially parallel to the shift axis and in a direction substantially perpendicular to the shift axis during movement of the piston 512 within the housing 514. Compression springs 516, also disposed within the bore 513, are biased between a cover 518 of the housing 514 and one end 520 of the valve 512. The plate 502 of the one-way clutch is disclosed in its overrun position in FIG. 1a and moves to its locked position in FIG. 1c. Application of a control pressure 522 through a control portion 523 of the housing 514 at the opposite end 524 of the valve or piston 512 causes the valve 512 to move against the biasing action of the compression springs 516 so that the actuating pin 508, which is secured to the control plate 502 at a pin attachment portion 526, moves within the curved pin recess or groove 510 formed in the outer surface 528 of the valve 512 as shown in FIGS. 1b and 1c. As shown in FIG. 1c, one of the struts 504 now extends through an aperture 530 formed in the control plate 502 to lock the one-way clutch.

Other U.S. patent publications which disclose controllable or selectable one-way clutches include U.S. Pat. Nos. 6,193,038; 7,198,587; 7,275,628; and 7,464,801, and U.S. Publication Application Nos. 2007/0278061; 2008/0110715; 2009/0159391; 2009/0211863; 2010/0230226; and 2014/0190785.

Other U.S. patent documents related to the present application include: U.S. Pat. Nos. 2,947,537; 2,959,062; 4,050,560; 4,340,133; 4,651,847; 6,607,292; 6,905,009; 7,942,781; 8,061,496; 8,286,772; 2004/0238306; 2006/0185957; 2007/0034470; 2009/0255773; 2010/0022342; 2010/0255954; 2011/0177900; 2012/0090952; 2012/0152683; and 2012/0152687.

As used herein, the term "sensor" is used to describe a circuit or assembly that includes a sensing element and other components. In particular, as used herein, the term "magnetic field sensor" is used to describe a circuit or assembly that includes a magnetic field sensing element and electronics coupled to the magnetic field sensing element.

As used herein, the term "magnetic field sensing element" is used to describe a variety of electronic elements that can sense a magnetic field. The magnetic field sensing elements can be, but are not limited to, Hall effect elements, magnetoresistance elements, or magnetotransistors. As is known, there are different types of Hall effect elements, for example, a planar Hall element, a vertical Hall element, and a circular vertical Hall (CVH) element. As is also known, there are different types of magnetoresistance elements, for example, a giant magnetoresistance (GMR) element, an anisotropic magnetoresistance element (AMR), a tunneling magnetoresistance (TMR) element, an Indium antimonide (InSb) sensor, and a magnetic tunnel junction (MTJ).

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of sensitivity perpendicular to a substrate, while magnetoresistance elements and vertical Hall elements (including circular vertical Hall (CVH) sensing elements) tend to have axes of sensitivity parallel to a substrate.

Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet, and a magnetic field sensor that senses a magnetic field density of a magnetic field Modern automotive vehicles employ an engine transmission system having gears of different sizes to transfer power produced by the vehicle's engine to the vehicle's wheels based on the speed at which the vehicle is traveling. The engine transmission system typically includes a clutch mechanism which may engage and disengage these gears. The clutch mechanism may be operated manually by the vehicle's driver, or automatically by the vehicle itself based on the speed at which the driver wishes to operate the vehicle.

In automatic transmission vehicles, a need arises for the vehicle to sense the position of the clutch for smooth, effective shifts between gears in the transmission and for overall effective transmission control. Therefore, a clutch-position sensing component for sensing the linear position of the clutch may be used by automatic transmission vehicles to facilitate gear shifting and transmission control.

Current clutch-position sensing components utilize magnetic sensors. One advantage to using magnetic sensors is that the sensor need not be in physical contact with the object being sensed, thereby avoiding mechanical wear between the sensor and the object. However, actual linear clutch measurement accuracy may be compromised when the sensor is not in physical contact with the sensed object because of a necessary gap or tolerance that exists between the sensor and the object. Moreover, current sensing systems addressing this problem use coils and certain application-specific integrated circuits which are relatively expensive U.S. Pat. No. 8,324,890 discloses a transmission clutch position sensor which includes two Hall sensors located at opposite ends of a flux concentrator outside the casing of the transmission to sense a magnetic field generated by a magnet attached to the clutch piston. To reduce sensitivity to magnet-to-sensor gap tolerances, a ratio of the voltage of one Hall sensor to the sum of the voltages from both Hall sensors is used to correlate to the piston and, hence, clutch position.

For purposes of this application, the term "coupling" should be interpreted to include clutches or brakes wherein one of the plates is drivably connected to a torque delivery element of a transmission and the other plate is drivably connected to another torque delivery element or is anchored and held stationary with respect to a transmission housing. The terms "coupling", "clutch" and "brake" may be used interchangeably.

SUMMARY OF EXAMPLE EMBODIMENTS

An object of at least one embodiment of the present invention is to provide a failsafe electromechanical system and an overrunning coupling and control assembly using the system wherein electrical power is conserved and a system failure does not result in inadvertent engagement of a clutch assembly.

In carrying out the above object and other objects of at least one embodiment of the present invention an electromechanical system for controlling the operating mode of a selectable clutch assembly is provided. The system includes a control member mounted for controlled movement and a bi-directional, electrically-powered, actuator assembly coupled to the control member for selective, small-displacement, control member movement between different positions which correspond to different operating modes of the clutch assembly. The actuator assembly holds the control member in a desired one of the positions after electrical power to the actuator assembly has been purposefully terminated. Control logic is operative to determine a system failure and to generate a failsafe position command signal in the event of the system failure. The actuator assembly moves the control member to a failsafe position based on the failsafe position command signal to prevent inadvertent engagement of the clutch assembly.

The control logic may determine the desired position of the control member based on a command signal received from a remote electronic control unit through a bus. The electronic control unit may be transmission electronic control unit of a vehicle and the bus may be a vehicle-based bus.

The actuator assembly may include a servomotor having an output shaft for driving the control member. The actuator assembly may include at least one non-contact position sensor to provide a position feedback signal as a function of the position of the control member. The control logic may control the servomotor based on the position feedback signal.

Each sensor may include at least one magnetic or ferromagnetic magnet mounted for movement and at least one magnetic field sensing element disposed adjacent and stationary with respect to the at least one magnet for sensing magnetic flux to produce the position feedback signal. Each magnetic field sensing element may be a Hall effect sensor.

The system failure may be an unexpected loss of electrical power to the actuator assembly.

The actuator assembly may include a rotary output shaft wherein the assembly may include a latch mechanism which includes a self-locking worm gear drive coupled to the output shaft to convert rotary motion of the output shaft to linear motion.

The actuator assembly may include a sector gear coupled to the control member for the selective, small-displacement, control member movement.

The system failure may be an unexpected loss of electrical power to the actuator assembly wherein the actuator assembly may include a failsafe power circuit to controllably store electrical power and supply the stored electrical power to the servomotor in the event of the unexpected loss of electrical power.

The system failure may be a loss of communication with the remote electronic control unit.

The actuator assembly may include a rotary output shaft and a lead screw flexibly coupled to the output shaft to convert rotary motion of the output shaft to linear motion.

Further in carrying out the above object and other objects of at least one embodiment of the present invention an overrunning coupling and electromechanical control assembly is provided. The assembly includes a coupling subassembly including first and second coupling members having first and second coupling faces, respectively, in close-spaced opposition with one another. At least one of the members is mounted for rotation about a rotary axis. A control member is mounted for controlled shifting movement between the coupling faces. A bi-directional, electrically-powered, actuator subassembly is coupled to the control member for selective, small-displacement, control member movement between different positions which correspond to different operating modes of the coupling subassembly. The actuator subassembly holds the control member in a desired one of the positions after electrical power to the actuator subassembly has been purposefully terminated. Control logic is operative to determine a power or communication failure and to generate a failsafe position command signal in event of the failure. The actuator subassembly moves the control member to a failsafe position between the coupling faces based on the position command signal to prevent inadvertent engagement of the coupling subassembly.

The control logic may determine the desired position of the control member between the coupling faces based on a command signal received from a remote electronic control unit through a bus. The electronic control unit may be a transmission electronic control unit of a vehicle and the bus may be vehicle-based.

The actuator subassembly may include a servomotor having an output shaft for driving the control member.

The actuator subassembly may include at least one non-contact position sensor to provide a position feedback signal as a function of the position of the control member. The control logic may control the servomotor based on the position feedback signal.

Each sensor may include at least one magnetic or ferromagnetic magnet mounted for movement and at least one magnetic field sensing element disposed adjacent and stationary with respect to the at least one magnet for sensing magnetic flux to produce the position feedback signal. Each magnetic field sensing element may be a Hall effect sensor.

The failure may be an unexpected loss of electrical power to the actuator subassembly.

The actuator subassembly may include a rotary output shaft and a latch mechanism which may include a self-locking worm gear drive coupled to the output shaft.

The actuator subassembly may include a sector gear coupled to the control member for the selective, small-displacement, control member movement.

The failure may be an unexpected loss of electrical power to the actuator subassembly wherein the actuator subassembly may include a failsafe power circuit to controllably store electrical power and supply the stored electrical power to the servomotor in the event of the unexpected loss of electrical power.

The failure may be a loss of communication with the remote control unit.

The coupling members may be clutch members, the coupling faces may be clutch faces and the control member may be a selector plate.

The actuator subassembly may include a rotary output shaft and a lead screw flexibly coupled to the output shaft to convert rotary motion of the output shaft to linear motion.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

DETAILED DESCRIPTION OF EXAMPLE EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1A:
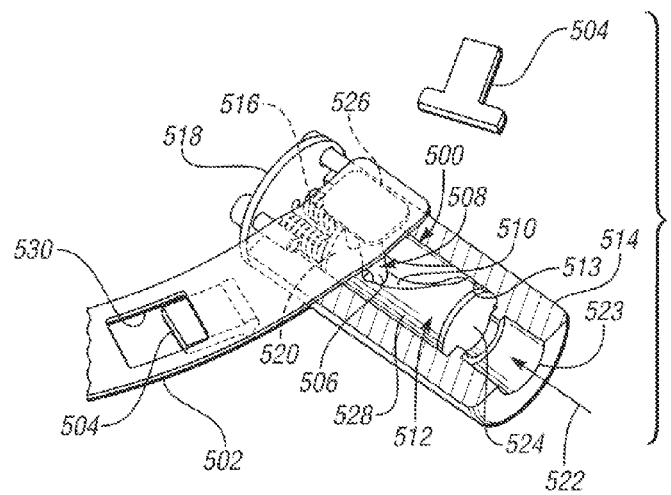
FIGS. 1a-1c are schematic views, partially broken away and in cross section, of a control member or element with associated struts and its control apparatus of the prior art in the form of a perpendicular actuating shift valve or piston (latching mechanism) in different control positions in the different views.
Figure 1B:
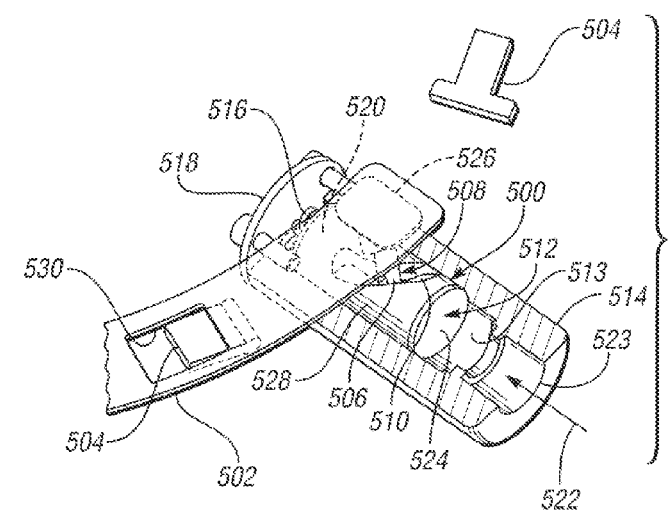
Figure 1C:
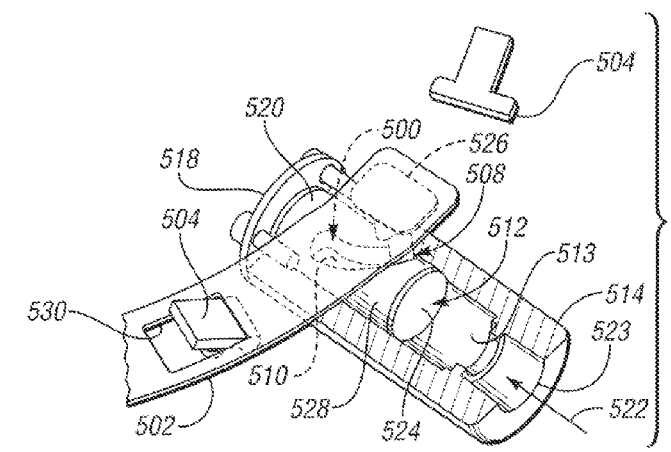
Figure 2:
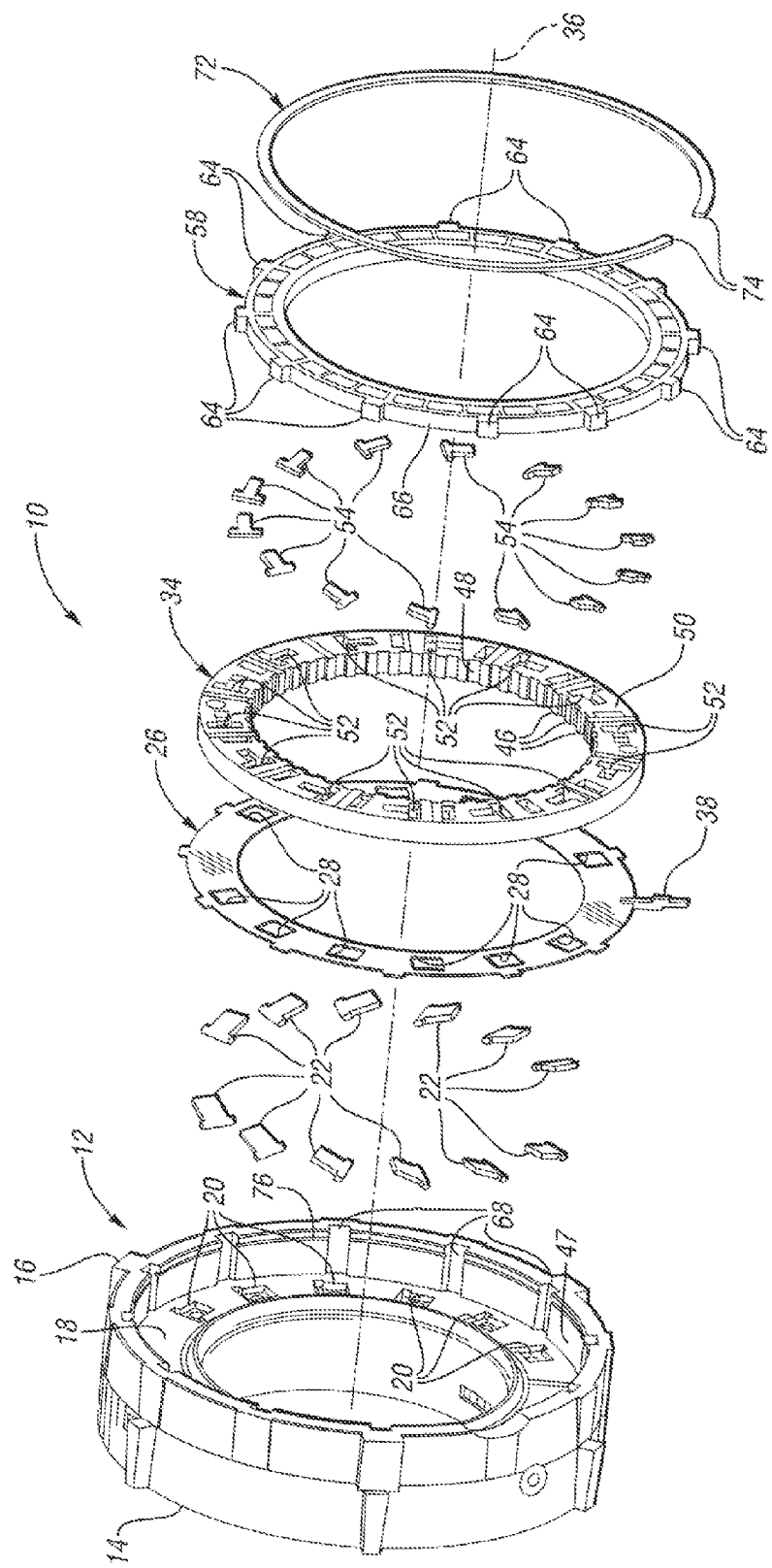
FIG. 2 is an exploded perspective view of an overrunning coupling or clutch assembly constructed in accordance with at least one embodiment of the present invention.

Referring again to the drawing figures, FIG. 2 is an exploded perspective view of an overrunning clutch or coupling assembly, generally indicated at 10, and constructed in accordance with at least one embodiment of the present invention. However, it is to be understood that the present invention can be utilized with a wide variety of selectable clutches, such as clutches having three or more operating modes or states. In fact, the present invention may be used with controllable mechanical diodes (CMDs) having an infinite number of operating modes or mechanical states.

As described in U.S. Pat. No. 8,602,187, and published U.S. patent application No. 2014/0190785, both assigned to the assignee of the present application, the assembly 10 includes an annular reverse pocket plate or first outer coupling member, generally indicated at 12. An outer axially-extending surface 14 of the plate 12 has external splines 16 for coupling the plate 12 to the inner surface of a transmission case (not shown). An inner radially extending surface or coupling face 18 of the plate 12 is formed with spaced pockets 20 in which reverse struts 22 are pivotally biased outwardly by coil springs (not shown) disposed in the pockets 20 under their respective struts 22. Preferably, twelve reverse struts 22 are provided. However, it is to be understood that a greater or lesser number of reverse struts 22 may be provided.

The assembly 10 also includes a control member or element in the form of a selector slide plate, generally indicated at 26, having a plurality of spaced apertures 28 extending completely therethrough to allow the reverse struts 22 to pivot in their pockets 20 and extend through the apertures 28 to engage spaced locking formations or ramped reverse notches (not shown) formed in a radially extending surface or coupling face of a forward or inner pocket plate or coupling member, generally indicated at 34, when the plate 26 is properly angularly positioned about a common central rotational axis 36 by an actuator pin 38. The pin 38 is coupled or secured to the plate 26 to move therewith.

The pin 38 may extend through a notch or elongated slot formed through a wall or wall portion of an outer circumferential end wall of the plate 12 as shown in U.S. Pat. No. 8,602,187. The wall may be a common wall separating and shared by the first coupling member 12 and a housing of the control system. The elongated slot may extend between and thereby communicate an inner surface of the housing and an inner surface of the wall of the first coupling member 12. The pin 38 may move in the slot between different use positions to cause the plate 26 to slide or shift between its control positions to alternately cover or uncover the struts 22 (i.e., to engage or disengage the reverse struts 22, respectively).

The plate 34 comprises a splined ring having internal splines 46 formed at its inner axially extending surface 48. A radially extending surface 50 or coupling face spaced from the other coupling face (not shown) of the plate 34 has a plurality of spaced pockets 52 formed therein to receive a plurality of forward struts 54 therein which are pivotally biased by corresponding coil springs (not shown). Preferably, fourteen forward struts 54 are provided. However, it is to be understood that a greater or lesser number of forward struts 54 may be provided.

The assembly 10 may also include a second outer coupling member or notch plate, generally indicated at 58, which has a plurality of locking formations, cams or notches (not shown) formed in a radially extending surface or coupling face (not shown) thereof by which the forward struts 54 lock the forward plate 34 to the notch plate 58 in one direction about the axis 36 but allow free-wheeling in the opposite direction about the axis 36. The notch plate 58 includes external splines 64 which are formed on an outer axial surface 66 of the plate 58 and which are received and retained within axially extending recesses 68 formed within the inner axially extending surface 47 of the outer circumferential end wall of the plate 12.

The assembly 10 may further include a snap ring, generally indicated at 72, having end portions 74 and which fits within an annular groove 76 formed within the inner surface 47 of the end wall of the plate 12 to hold the plates 12, 26, 34 and 58 together and limit axial movement of the plates relative to one another.

The pin 38 has a control position to disengage the reverse struts 22. In one embodiment, a pin 38 is rotated about 7° in a forward overrun direction about the axis 36 to rotate the selector plate 26 to, in turn, allow the reverse struts 22 to move from their disengaged position in their pockets 20 to their engaged position with the notches (not shown) of the plate 34.

Figure 5:
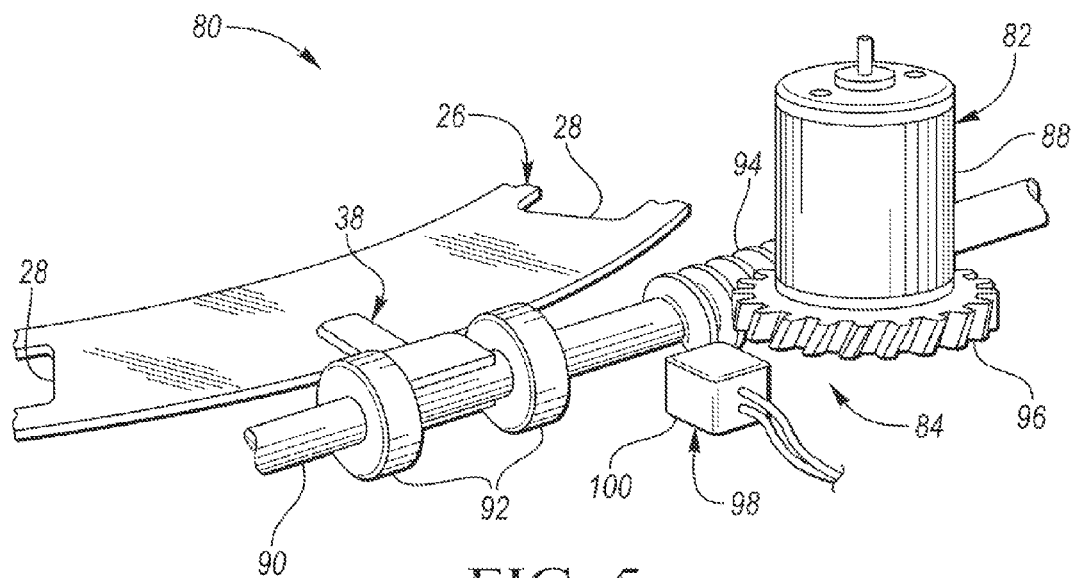
FIG. 5 is a perspective, schematic view, partially broken away, of the first embodiment of FIG. 3.
Figure 6:
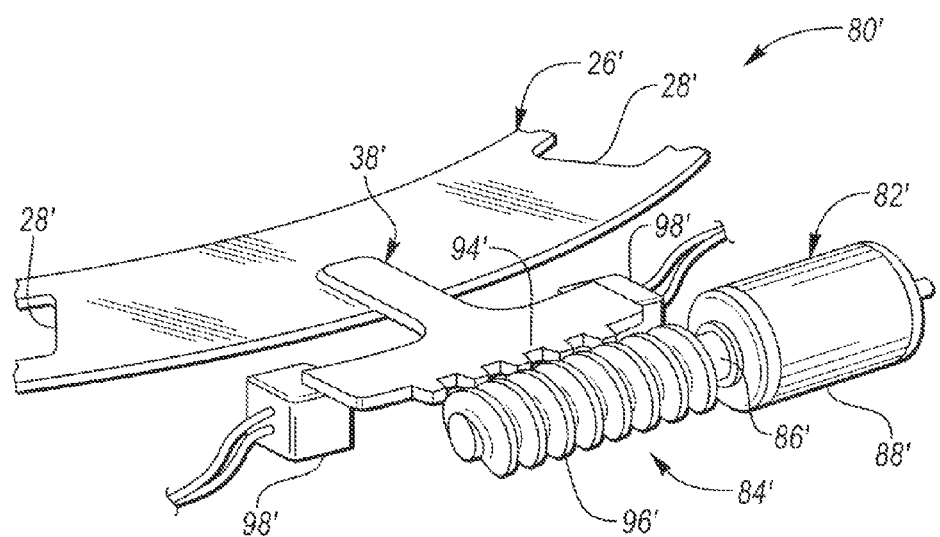
FIG. 6 is a perspective, schematic view, partially broken away, of the second embodiment of FIG. 4.
Figure 7:
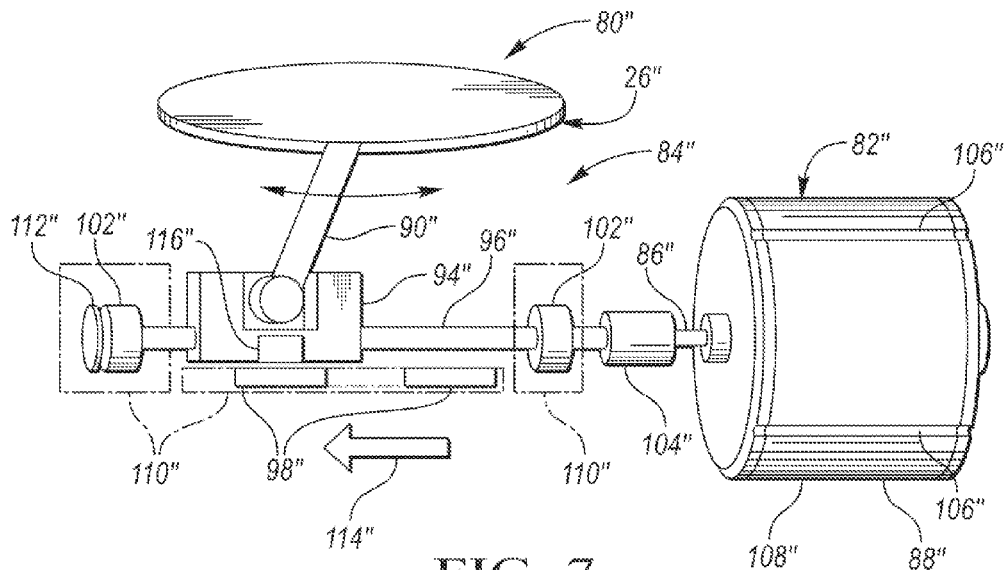
FIG. 7 is a perspective, schematic view of a third embodiment of such a system.

In three disclosed embodiments, an electromechanical system for controlling the operating mode or state of the selectable clutch assembly 10 is generally indicated at 80, 81' and 80" in FIGS. 5, 6 and 7, respectively, wherein parts of the second embodiment which perform the same or similar function as the parts of the first embodiment have the same reference number but a single prime designation and wherein parts of the third embodiment which perform the same or similar function as the parts of the first two embodiments have the same reference number but a double prime designation.

The system 80 of the first embodiment (i.e. FIGS. 3 and 5) includes a bi-directional, electrically-powered, actuator assembly, generally indicated at 82, coupled to the control member or plate 26 for selective, small-displacement, control member or plate movement between first and second positions which correspond to first and second operating modes of the clutch assembly 10, respectively. As previously mentioned, more than two positions may be provided such as three positions of a three state CMD. In fact, at least in theory, an infinite number of states can be supported.

The actuator assembly 82 holds the control member 26 in the desired commanded position after electrical power to the actuator assembly 82 has been purposefully terminated. In the embodiments of the drawing figures, a latch mechanism of the assembly 82 may include a self-locking worm gear drive, generally indicated at 84, coupled to the output shaft 86 of a bi-directional D.C. motor or servomotor 88.

Figure 3:
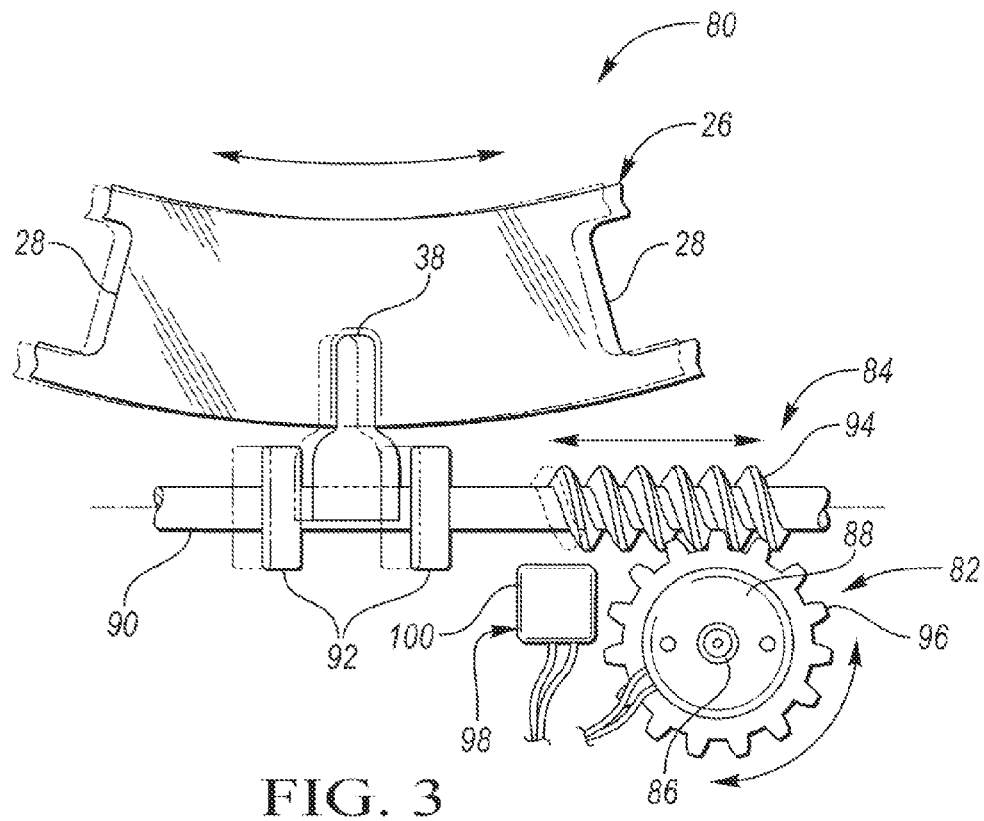
FIG. 3 is a top plan view, partially broken away, of a first embodiment of an electromechanical system for controlling the operating mode or state of a selectable clutch assembly generally of the type shown in FIG. 2.

In the first embodiment of FIGS. 3 and 5, the actuator assembly 82 includes an actuator arm 90 on which the actuator pin 38 is supported between a pair of spacers 92. The actuator arm 90 is supported for rotary motion by a pair of spaced bushings (not shown). A worm groove 94 is formed at one end of the actuator arm 90. The worm groove 94 meshes with a gear wheel 96 of the gear drive 84. The gear wheel 96 is mounted for rotation on the output shaft 86 of the servomotor 88 (i.e., bi-directional D.C. motor).

The actuator assembly 82 also includes a non-contact position sensor, generally indicated at 98, to provide a position feedback signal as a function of the position of the control member 26. The sensor 98 may include at least one magnetic or ferromagnetic magnet (not shown) mounted for movement on one or more teeth of the gear wheel 96 and at least one magnetic field sensing element 100 disposed adjacent and stationary with respect to the at least one magnet for sensing magnetic flux to produce the position feedback signal. Each magnetic field sensing element 100 is preferably a Hall effect sensor.

Since the worm gear drive 84 locks, no separate latching device is typically needed. A POWER-ON home function typically requires relative position sensing (either counting drive gear teeth or features on the actuator arm 90) as described in detail hereinbelow.

Figure 4:
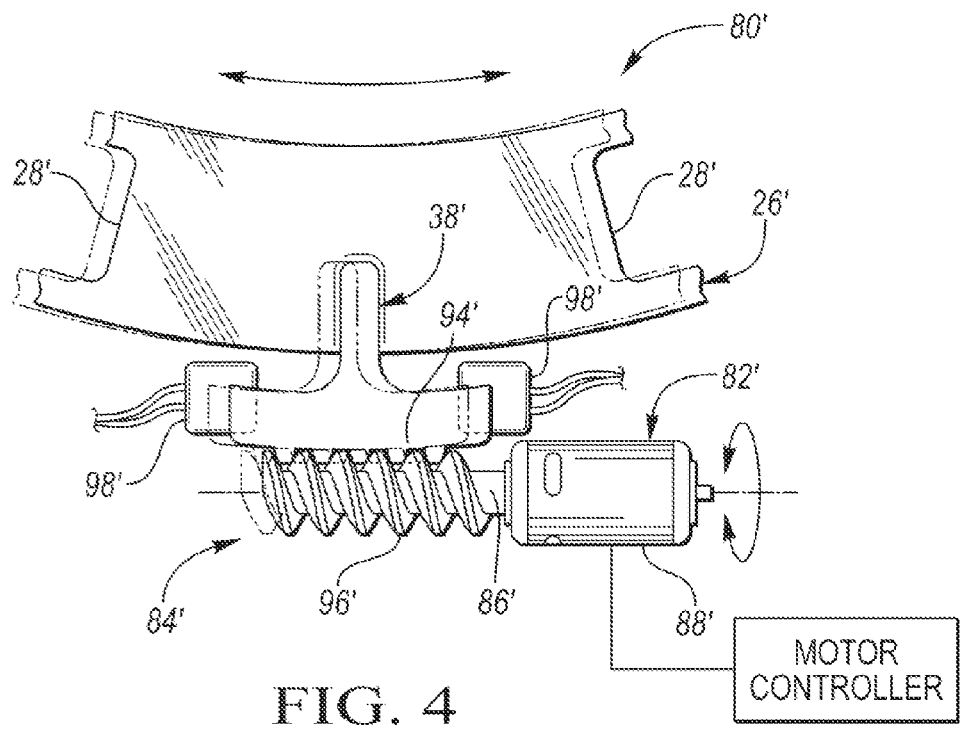
FIG. 4 is a top plan view, partially broken away, of a second embodiment of such a system.

In the second embodiment of FIGS. 4 and 6, the actuator arm 90 of FIGS. 3 and 5 is removed and a worm gear drive 84' directly acts on an actuator pin, generally indicated at 38', which has a sector gear portion 94' on which one or more magnets (not shown) may be mounted for movement. The second embodiment of FIGS. 4 and 6 shows a three position actuator pin 38' with the actuator pin 38' in a middle position.

Since the actuator pin 38' moves in an arc, care typically has to be taken to ensure good worm and actuator mesh. Two digital Hall effect sensors 98' are partially covered when the pin 38' is in the middle position. A single analogue Hall effect sensor may be used instead of the two digital sensors 98'.

In the third embodiment of FIG. 7, a lead screw 96" is rotatably supported by spaced bushings 102" and is flexibly coupled by a flex coupling 104" to the output shaft 86" of a brushed DC electric motor 88" of the actuator assembly 82". The flex coupling 104" takes up any axial and angular misalignment. Typically the motor end of the coupling 104" is pressed on by the manufacturer. Keyways 106" are formed in the housing 108" of the motor 88" and mate with keys (not shown) formed, for example, on the inner surface of a clutch housing 110" to keep the motor body from spinning.

A custom nut 94" is threadably mounted on the lead screw 96" to move linearly along the lead screw 96" upon rotation of the lead screw 96" by the motor 88" through the coupling 104". An actuator arm 90" is mounted on the nut 94" to move through an arc and is coupled to the selector plate 26" to move the selector plate 26" through a corresponding arc upon rotation of the lead screw 96".

The bushings 102" are mounted at spaced locations in the clutch housing 110" wherein the clutch housing 110" operates as end stops at the locations. A thrust washer 112" secures the lead screw 96" on one of the bushings 102". An arrow 114" indicates a direction of selector plate forces.

Sensors in the form of a pair of spaced digital Hall effect sensors 98" are mounted on the clutch housing 110" to sense position of a magnet 116" supported on the nut 94" to move therewith. Alternatively, a single analogue Hall effect sensor (indicated by the phantom lines between the sensor 98") could replace the two digital Hall effect sensors 98".

In summary, the electric motor 88" spins the lead screw 96" which translates the motor's rotational motion into the nut's linear motion. The nut 94" has a cutout feature that holds the actuator arm 90" captive, converting the nut's linear motion into the arc motion of the selector plate's actuator arm 90". Bushings 102" installed along the lead screw 96" allow the screw 96" to rotate with low losses. In the event excessive selector plate forces are present, the thrust washer 112" (part of the left side end stop in FIG. 7) absorbs the thrust load.

Figure 8:
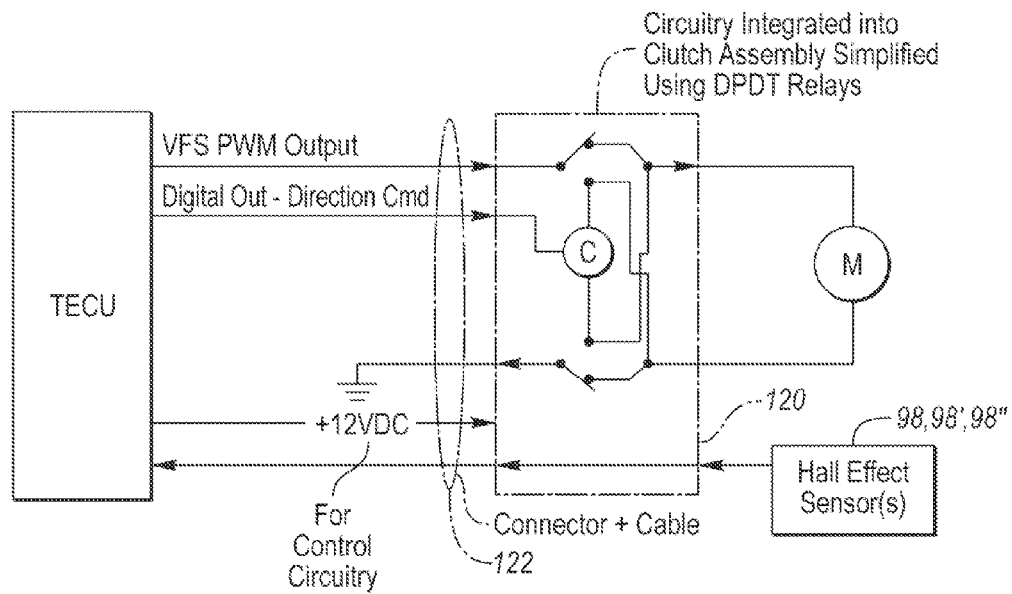
FIG. 8 is a block diagram view of a transmission ECU (i.e. TECU), a power switching and supply circuit, an electro-mechanical actuator such as a DC motor and one or more sensors for controlling the operating mode or state of the coupling assembly of at least one embodiment of the present invention and illustrating various signals passing therebetween.

Referring now to FIG. 8, there is illustrated a power switching and supply circuit 120 to supply DC power of a first polarity to the DC motor in response to power and direction command signals (VFS PWM output and digital out-direction Cmd) from the TECU during normal operation (i.e. in the absence of a system failure such as a loss of power or communication). The embodiment in FIG. 8 is specifically for integrating the vehicle's transmission electronic control unit (TECU) and bi-directional control of the DC motor.

The TECU provides and regulates the power to drive the motor. The circuitry 120 connects the motor so that bi-directional control of the motor is achieved. The TECU decides which direction to drive the motor, sets a digital output accordingly and then turns on its VFS (variable force solenoid) output to drive the motor. Existing TECUs' have traditionally employed variable force solenoid valve control to manipulate the transmission's hydraulic control circuit to change clutch states. Electromechanical clutch actuation as provided herein repurposes the TECU's existing outputs in order to minimize cost and preserve a common TECU for both hydraulic and electromechanical clutch actuation schemes. The VFS outputs are typically unipolar, current controlled, pulse width modulated (PWM) driver circuits and can therefore only drive the bi-directional motor in a single direction. In order to provide a minimally invasive method for the existing TECU architecture to control the bi-directional motor, the circuit 120 is provided. The circuitry 120 could be implemented or realized with discrete logic or a microcontroller depending on the system's requirements.

In summary, the circuitry of FIG. 8 allows the TECU to control both the direction and speed of the electric motor requiring only a single TECU PWM output, and a simple digital output for determining motor direction. The DPDT (double pole, double throw) relays of the circuit 120 are typically solid state switches. There are a number of ways that the switching of the motor leads in circuit 120 can be achieved: DPDT relays, discrete solid state switches or a full H-bridge module.

Figure 11:
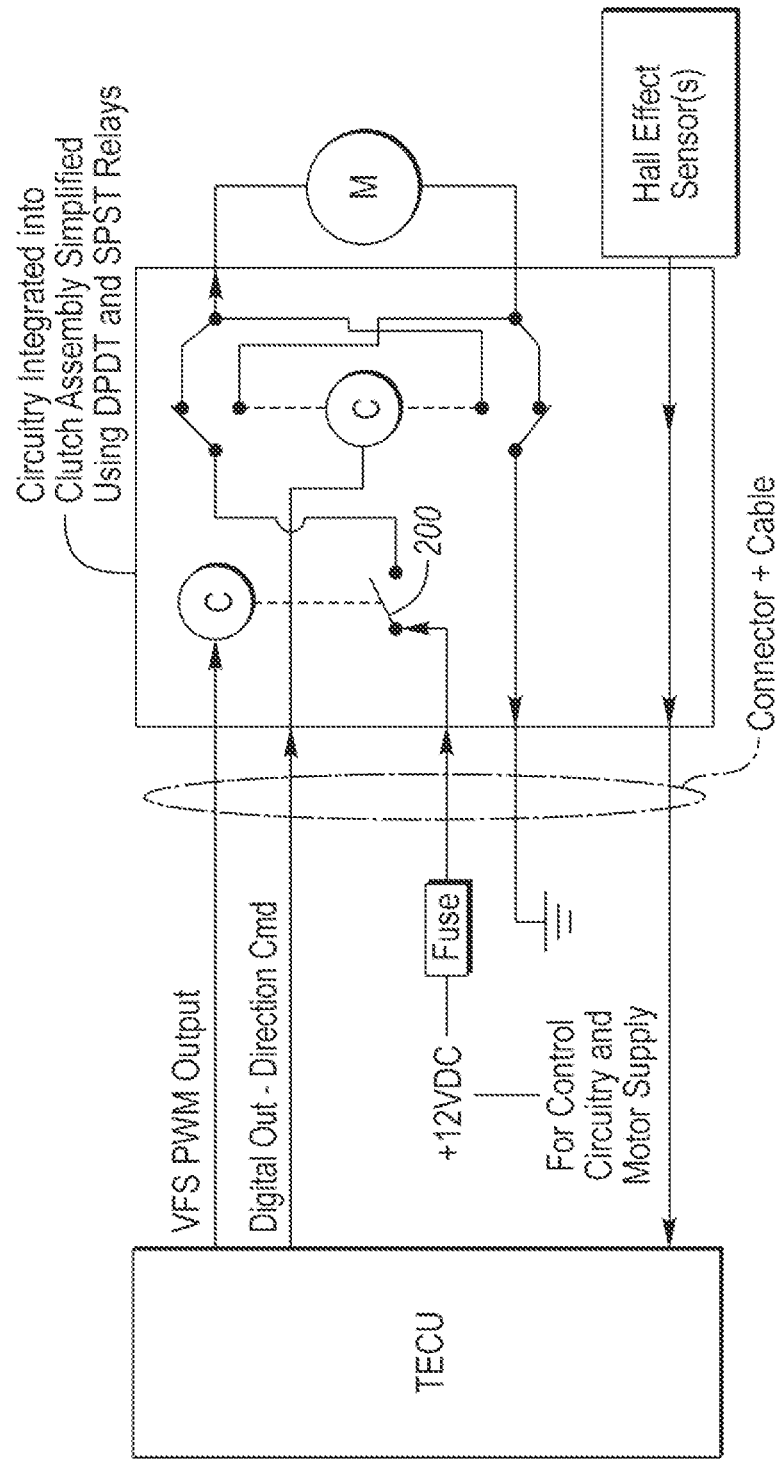
FIG. 11 is a view similar to the view of FIG. 8 wherein the elements of FIG. 8 have been modified so that the TECU directly controls the motor while indirectly powering it.

Referring now to FIG. 11, there is illustrated another embodiment of a controller suitable for use when the TECU typically cannot supply enough current to the motor. Here, the TECU directly controls the motor while indirectly powering it. This is to be compared with the circuitry of FIG. 8 wherein the TECU's power output is connected to the motor's terminals. FIG. 11 shows the power signal driving a MOSFET 200 gate (shown as a SPST relay coil). The MOSFET 200 then supplies current to the motor.

Figure 12:
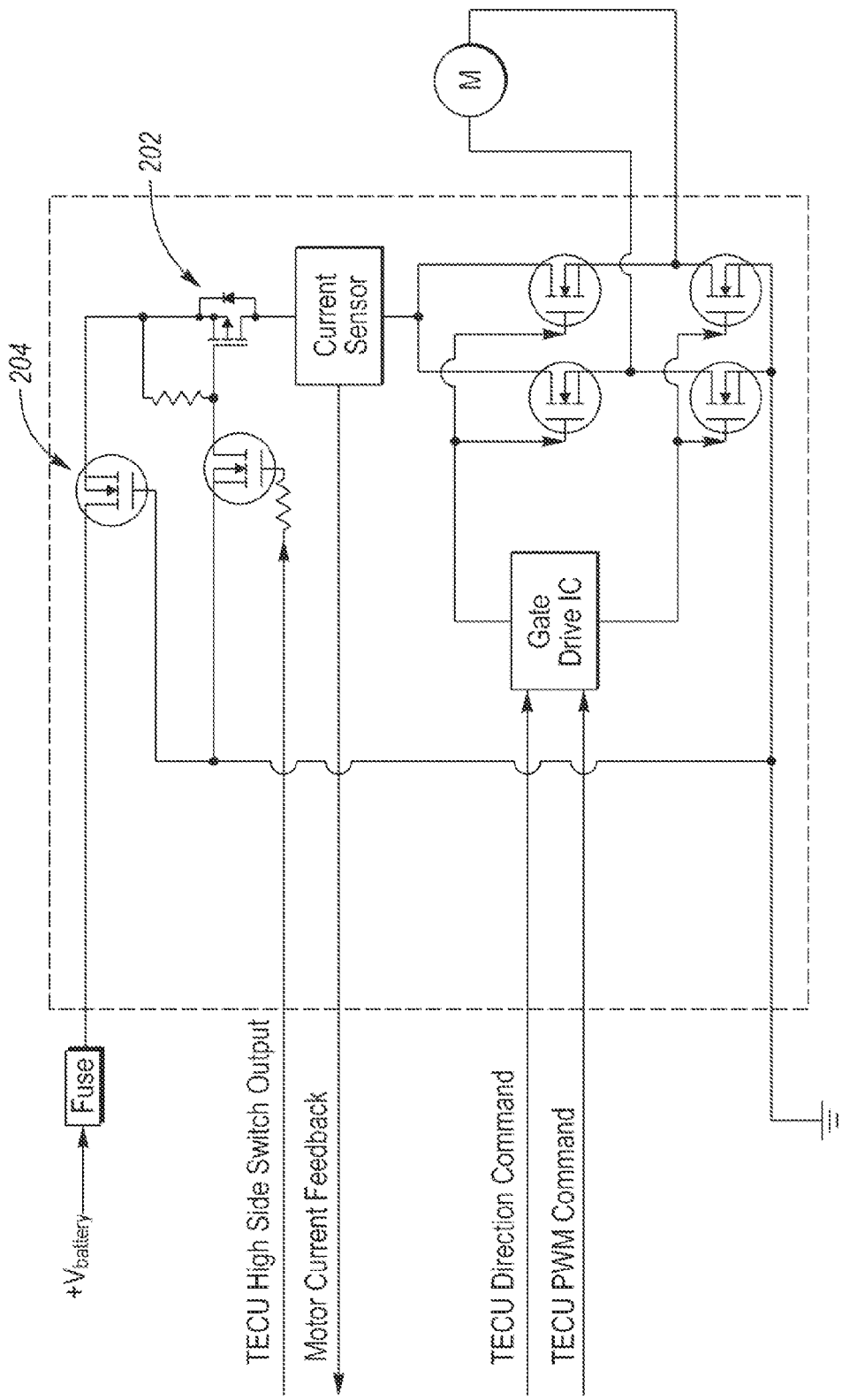
FIG. 12 is a schematic block diagram of a controller power stage including a high side switch and a reverse polarity protection switch.

Referring now to FIG. 12, when it is desired to control power to the controller even when not directly powered by the TECU, the controller power stage of FIG. 12 can be provided. The controller may be directly connected to battery power by providing a high side switch 202 wherein the TECU can disable power to the controller during faults and/or when the vehicle is keyed off. The high side switch 202 provides a way to disconnect the motor if the MOSFET driven by the PWM command is stuck "on".

Still referring to FIG. 12, for devices directly connected to automotive battery power, protection circuitry 204 is provided to protect against damage resulting from improper installation of the vehicle battery (i.e. wrong polarity). A simple P-channel MOSFET 204 is connected to the circuitry before the high side switch 202. If the battery is connected with improper polarity, the MOSFET 204 will have a positive voltage at its gate relative to the drain and turn itself "off". Under normal conditions, the drain will have positive battery voltage connected to it while the gate will have a ground potential thereby causing the MOSFET 204 to turn "on".

The direction command is a digital output on the TECU with "low" corresponding to a "safe clutch" (struts covered) condition. The PWM command is typically in a PWM output signal that the TECU uses to drive the MOSFETs and therefore control the current delivered to the motor. Alternatively, this signal could come from a variable force solenoid driver or from an independent PWM output. A current sensor is provided to provide feedback to the TECU to aid in detecting a locked clutch or problems with the motor.

Figure 10:
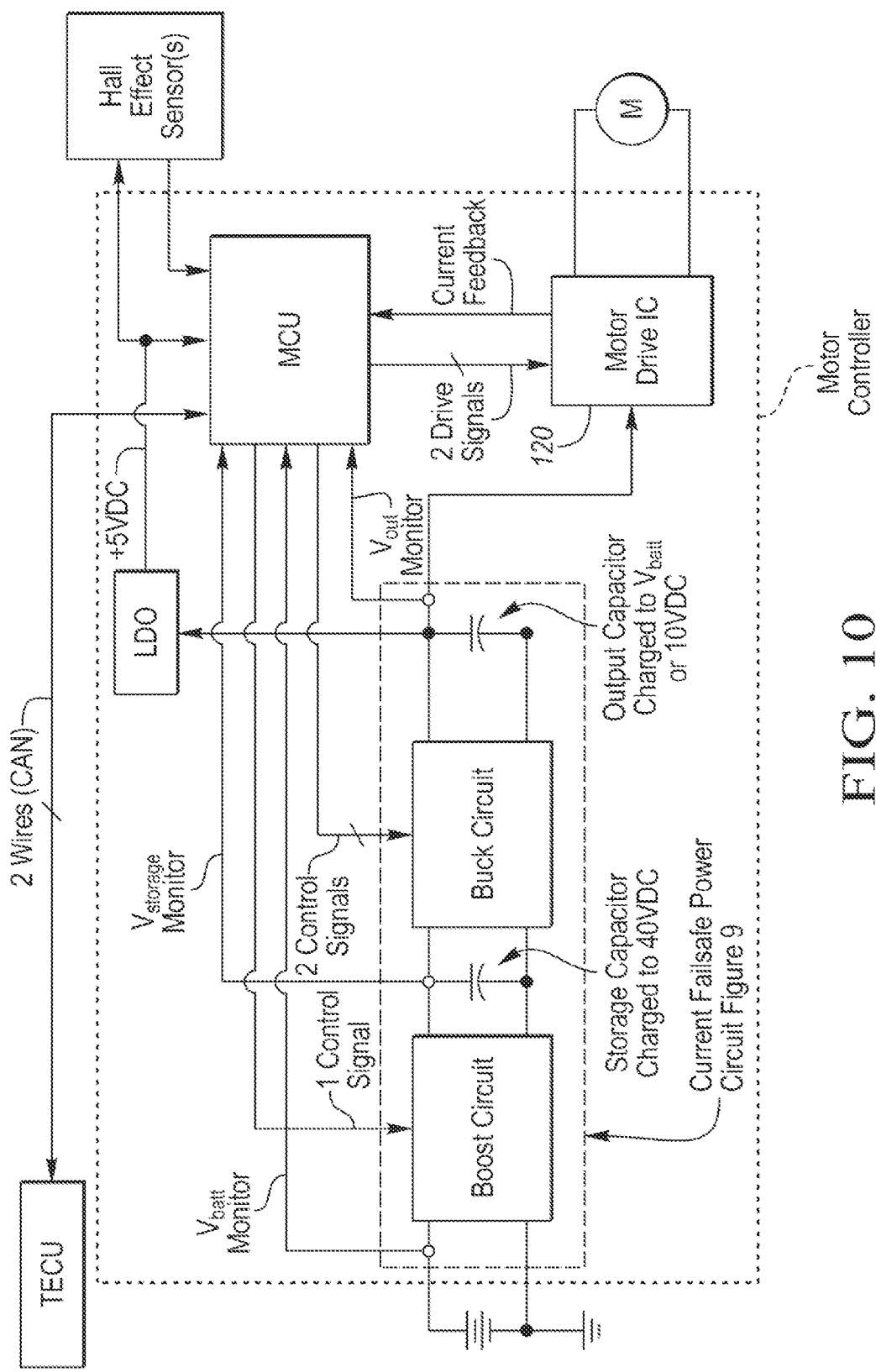
FIG. 10 is a block diagram schematic view of a motor controller for bi-directionally controlling the DC motor based on PWM output and direction commands from the TECU.

Referring now to FIG. 10, the system 80 (as well as the system 80' and the system 80") also includes a motor controller having a microcontroller (i.e. MCU) including control logic which may alternatively be found within other circuitry in the motor controller of the system 80. Again, the motor controller typically receives command signals from the remote electronic control unit (TECU) over or through a vehicle-based bus (i.e. connector and cable 122 of FIG. 8). FIG. 10 also shows a failsafe power circuit to controllable store electrical power and apply the stored electrical power to the motor drive IC or circuit 120 based on a failsafe position command signal in the event of a system failure such as communication or power failure as determined by the microcontroller (MCU). The motor drive IC 120 generates the power signals to the drive motor while the TECU remains in a supervisory role. The MCU could be replaced with an FPGA or a very extensive array of discrete modules. The failsafe power circuit can be designed without the low level diagnostics reporting to the TECU and then could receive actuation commands via digital outputs from the TECU and send high level status (i.e. sensor status or actuation controller is faulted) information back to the TECU via digital outputs on the actuation controller. Also, the failsafe actuation circuitry can be adapted to any electromechanical actuation scheme wherein mechanical latching occurs.

The MCU or microcontroller typically receives power and direction command signals from the TECU through a vehicle CAN bus. The MCU also receives various monitor, control and feedback signals to monitor different voltages within the power circuit to properly control the motor drive 120. The MCU receives one or more feedback signals from the Hall effect sensor(s) and a current feedback signal based on motor current. In turn, the MCU controls the operation of the boost circuit and the buck circuit of the power circuit as well as the motor drive 120.

An LDO (i.e. low dropout), DC linear voltage regulator regulates the voltage at the output capacitor and provides regulated voltage to the MCU and the Hall effect sensor(s).

The remote transmission ECU (TECU) typically has a microprocessor, called a central processing unit (CPU), in communication with a memory management unit (MMU). The MMU controls the movement of data among the various computer readable storage media and communicates data to and from the CPU. The computer readable storage media preferably include volatile and nonvolatile storage in read-only memory (ROM), random-access memory (RAM), and keep-alive memory (KAM). For example, KAM may be used to store various operating variables while CPU is powered down. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by CPU in controlling the transmission or vehicle into which the transmission is mounted.

The computer-readable storage media may also include floppy disks, CD-ROMs, hard disks, and the like. CPU communicates with various sensors, switches and/or actuators directly or indirectly via an input/output (I/O) and actuators directly or indirectly via an input/output (I/O) interface or vehicle bus (i.e., CAN, LIN, etc.). The interface may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to CPU. Some controller architectures do not contain an MMU. If no MMU is employed, the CPU manages data and connects directly to ROM, RAM, and KAM coupled to the MMU or CPU depending upon the particular application.

The various components or functions of the motor controller of FIG. 10 may be implemented by the separate motor controller as illustrated, or may be integrated or incorporated into the transmission ECU, or other controller, depending upon the particular application and implementation. The MCU typically include the control logic to control the actuator assembly (82 or 82' or 82"). The control logic may be implemented in hardware, software, or a combination of hardware and software.

The control logic is also operative to determine a system failure and to generate a failsafe position command or drive signal in the event of the system failure. The actuator assembly (82 or 82' or 82") moves the control member (26 or 26' or 26", respectively,) to a failsafe position based on the failsafe position command signal to prevent inadvertent engagement of the clutch assembly 10. Ordinarily, the control logic determines a desired one of the possible positons of the control member or plate (26 or 26' or 26") based on the command signal received from the remote electronic control unit through the bus 122. The system failure may be an unexpected loss of electrical power to the actuator assembly (82 or 82' or 82").

The motor controller of FIG. 10 typically includes an energy storage device or power circuit (including the storage and output capacitors of FIGS. 9 and 10) to controllably store and supply the stored electrical power to the motor drive 120 and, in turn, to the servomotor (88 or 88' or 88") in the event of the unexpected loss of electrical power. The system failure may be a loss of communication of the MCU with the remote electronic control unit.

Figure 9:
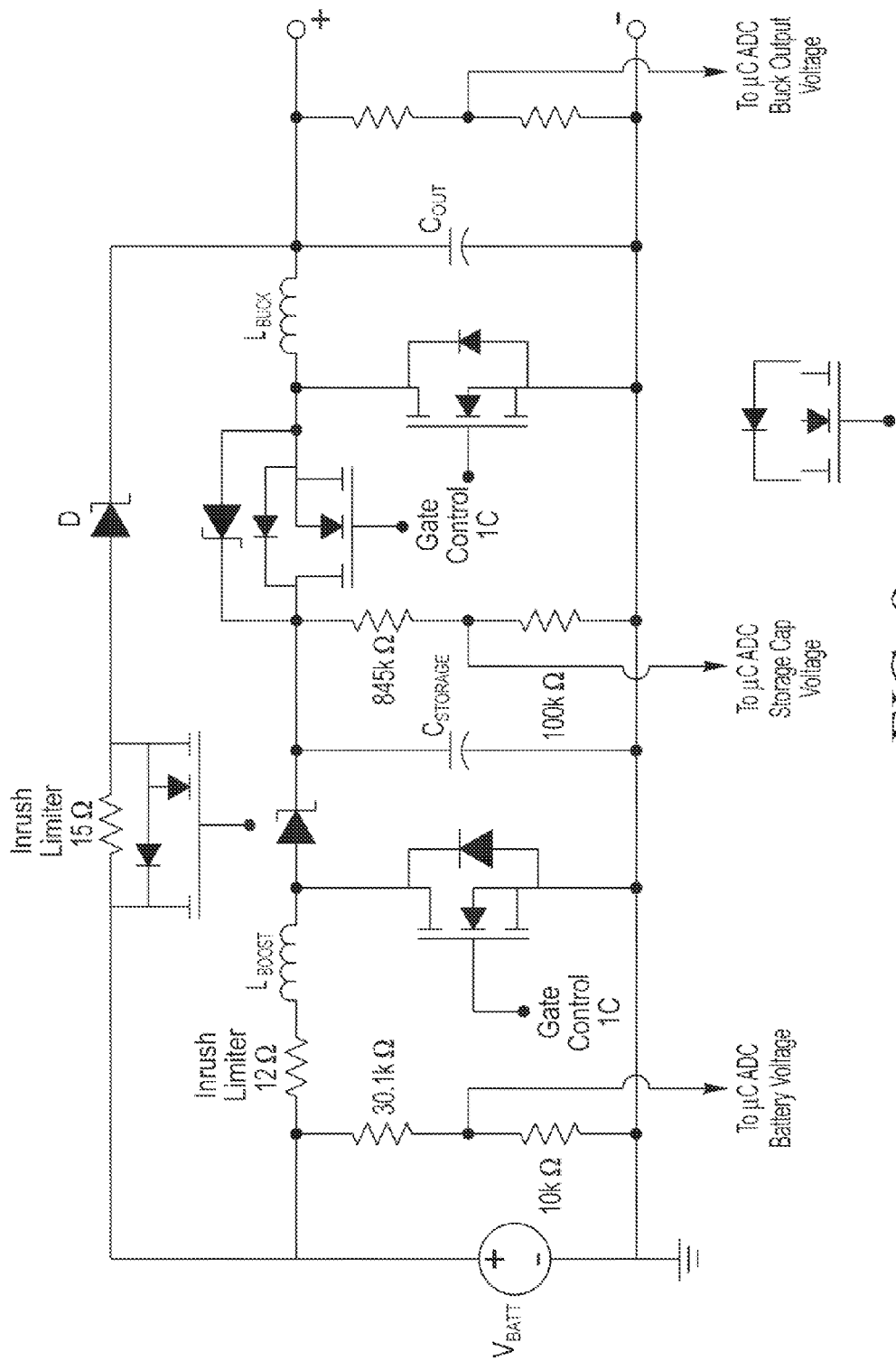
FIG. 9 is a circuit diagram of a failsafe power circuit for use with the other components of FIG. 10.

The circuit in FIG. 9 comprises backup or failsafe power circuitry for powering the motor and the MCU or microcontroller (through the LDO) in the event of loss of the vehicle's 12 VDC power supply. In normal operation, with the vehicle's 12 VDC present, the motor and the microcontroller's power will be sourced through the diode, D, at the top of the circuit of FIG. 9. The left hand side of the circuit of FIG. 10 is a boost converter or circuit that takes the vehicle's 12 VDC power and boost it to approximately 40 VDC and stores that energy in the storage capacitor. After "key on" and the vehicle's 12 VDC power has stabilized, the microcontroller (i.e. MCU) turns on the boost or converter (at a gate control device) and runs the boost converter until the storage capacitor is charged to 40 VDC. Then the boost converter will turn off, only turning back on when the storage capacitor's voltage has dropped below a preprogrammed threshold as monitored and determined by the MCU.

On the right hand side of the power circuit is a buck converter or circuit that uses the storage capacitor as its input. In the event of vehicle power loss, the microcontroller (i.e. MCU) will turn on the buck converter (at a gate control device) that will output the necessary voltage (at $C_{out}$) to operate the DC motor via the motor drive 120 and keep the microcontroller on via the LDO long enough to return the control member back to a safe (i.e. failsafe) position or condition.

As will be appreciated by one of ordinary skill in the art, one or more memory devices within the transmission ECU and/or the motor controller may store a plurality of activation schemes for the control member or plate 26 or 26' or 26" and may represent any one or more of a number of known processing strategies such as event-driven, interrupt-driven, multi-tasking, multi-threading, and the like. As such, various steps or functions may be performed in sequence, in a modified sequence, in parallel, or in some cases omitted. Likewise, the order of operation or processing is not necessarily required to achieve the objects, features, and advantages of the invention, but is provided for ease of illustration and description.

Although not explicitly illustrated, one of ordinary skill in the art will recognize that one or more of the illustrated steps or functions may be repeatedly performed depending upon the particular application and processing strategy being used. Preferably, the control logic is implemented primarily in software executed by a microprocessor-based controller or the microcontroller (i.e. MCU). Of course, the control logic may be implemented in software, hardware, or a combination of software and hardware depending upon the particular application. When implemented in software, the control logic is preferably provided in a computer-readable storage medium having stored data representing instructions executed by a computer to control the control member (26 or 26' or 26") of the system (80 or 80' or 80", respectively,) through the actuator assembly (82 or 82' or 82", respectively). The computer-readable storage medium or media may be any of a number of known physical devices which utilize electric, magnetic, and/or optical devices to temporarily or persistently store executable instructions and associated calibration information, operating variables, and the like.

In one example embodiment, the control member or plate is electromechanically driven by the actuator assembly including a rotary actuator such as the servomotor and associated transmission in the form of the worm gear drive, or lead screw or the like. The servomotor (88 or 88' or 88") may be, for example, a brushed or brushless DC servomotor, the operation of which is controlled by the motor controller via a motor drive or driver (such as an H bridge motor driver) within the servomotor controller. The brushed or brushless motor may have its rotary speed and position controlled by pulse width modulation (PWM) control so that the position of the control member or plate is adjusted.

The motor controller outputs servomotor drive commands to the servomotor based on outputs from the Hall effect sensor(s) 98, 98' or 98", current feedback from the servomotor and/or decoded commands from the transmission ECU. The motor controller controls the servomotor through the motor drive 120 of the motor controller so that the angular position of the control member is changed. In other words, the transmission ECU outputs servomotor drive commands to the motor controller which controls the servomotor and, through its transmission, the selector plate.

The TECU and the motor controller are connected via a vehicle bus such as a local interconnect network (LIN or CAN) line or bus capable of two-way communications. LIN is one of many possible in-vehicle local area network (LAN) communications protocols. A power line and a ground line may be provided between the TECU and the motor controller. The motor controller typically includes a transceiver interface within the MCU, a microprocessor and its control logic within the MCU, and the motor drive or driver 120, and an electrical power source (provided by the failsafe power circuit). The motor controller may be integrated or physically coupled with the servomotor in the clutch housing, while the TECU is provided some distance away from the clutch housing.

The power source or circuit of the motor controller supplies electric power of predetermined voltage levels to the MCU and the Hall effect sensor(s) through the LDO and the motor drive or driver. The transceiver within the MCU is a communications interface circuit connected to the network or vehicle bus for communications and operates as a receiver section for the MCU and a transmitter section back to the TECU. The motor driver typically includes the driver circuit for driving the servomotor as shown in FIG. 8.

The Hall effect sensor(s) are typically provided near or coupled to the rotary output shaft of the servomotor or near or coupled to the gear drive (which mechanically couples the output shaft of the motor with the selector plate) and may be driven in synchronism with the rotation of the servomotor to generate pulse signals which are received by the MCU.

The MCU of the motor controller typically includes a memory and may be configured as a conventional microcomputer including a CPU, a ROM, a RAM and the like or as a hardwired logic circuit.

The TECU and the motor controller may perform data communications regularly through the LIN or CAN bus. In such data communications, the motor controller may transmit state data indicating the state of the servomotor to the TECU. The state data may include a present rotation position of the servomotor, that is, count value of a rotation position counter stored in a memory of the MCU of the motor controller.

The TECU and/or the motor controller may confirm the present rotation position of the servomotor. The TECU then may set a target stop position of the servomotor based on various states detected by non-contact position sensor(s) commands and the present rotation position of the servomotor, and generates a servomotor drive command for driving the servomotor to one or more target stop positions. Such a position sensor provides a position feedback signal as a function of the position of the control member or plate. Each sensor may include at least one magnetic or ferromagnetic magnet mounted for movement on the actuator assembly and at least one magnetic field sensing element disposed adjacent and stationary with respect to the at least one magnet in the clutch housing for sensing magnetic flux to produce the position feedback signal. Each magnetic field sensing element is preferably a Hall effect sensor.

When the logic circuit of the MCU of the motor controller receives servomotor drive commands from the TECU through its transceiver, it transmits drive commands or signals to the motor drive or driver 120 to rotate the servomotor in the forward or reverse direction so that the servomotor stops at a desired target stop position.

If the detected, present rotation position of the servomotor arrives at the target stop position, that is, the present position coincides with the target stop position, the logic circuit of the MCU transmits a stop command to the motor driver for stopping the servomotor.

In communicating with the TECU, the motor controller may transmit to the TECU the present rotation position of the servomotor detected based on the signals of the sensor(s) while the servomotor is in rotation. The motor controller may also transmit to the TECU stop data indicating the stop of the servomotor when the servomotor has stopped at its target stop position. The TECU typically checks if the data received from the motor controller includes the stop data therein. If the stop data is included, the TECU determines that the servomotor has stopped at its target stop position.

If the stop data indicating the stop of the servomotor is not included, the TECU typically compares the present rotation position of the servomotor received and the present rotation positions of the servomotor received in the previous communications to check whether the present rotation position has changed.

In view of the above, preferably the system utilizes a bidirectional DC motor, a transmission, one or more proximity sensors, a motor drive, a microcontroller, one or more proximity sensors and a capacitor energy storage and supply power circuit to do the following:
 a. actuate a multi-position, selectable, mechanical diode, selector plate and provide mechanical holding force via the worm gear or other transmission interface that requires no continuous electrical energy consumption to maintain;
 b. utilizes one or more proximity sensors to determine actual position of the selector plate;
 c. communicate with customer's transmission electronic control unit via a CAN or other vehicle bus to receive actuation commands and send selector plate position status and system diagnostic data; and
 d. provide an electronic failsafe that will return the clutch assembly to a safe position or state in the event of vehicle power loss or loss of communications with the transmission electronic control unit.

Previous electrical selectable, mechanical diode, actuation systems required a mechanical means of return so that the system would return to an initial state in the event of loss of power to the actuator. This resulted in requiring constant actuator electrical energy consumption to the actuator in order to maintain the actuated position. At least one embodiment of the present invention returns the selector plate to its initial, failsafe position in the event of vehicle power loss.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An electromechanical system for controlling the operating mode of a selectable clutch assembly, the system comprising:
 a control member mounted for controlled movement;
 a bi-directional, electrically-powered, actuator assembly coupled to the control member for selective, small-displacement, control member movement between different positions which correspond to different operating modes of the clutch assembly, the actuator assembly holding the control member in a desired one of the positions after electrical power to the actuator assembly has been purposefully terminated; and
 control logic operative to determine a system failure and to generate a failsafe position command signal in the event of the system failure, the actuator assembly moving the control member to a failsafe position based on the failsafe position command signal to prevent inadvertent engagement of the clutch assembly.

2. The system as claimed in claim 1, wherein the control logic determines the desired position of the control member based on a command signal received from a remote electronic control unit through a bus.

3. The system as claimed in claim 2, wherein the electronic control unit is a transmission electronic control unit of a vehicle and the bus is a vehicle-based bus.

4. The system as claimed in claim 1, wherein the actuator assembly includes a servomotor having an output shaft for driving the control member.

5. The system as claimed in claim 4, wherein the actuator assembly includes at least one non-contact position sensor to provide a position feedback signal as a function of the position of the control member, the control logic controlling the servomotor based on the position feedback signal.

6. The system as claimed in claim 5, wherein each sensor includes at least one magnetic or ferromagnetic magnet mounted for movement and at least one magnetic field sensing element disposed adjacent and stationary with respect to the at least one magnet for sensing magnetic flux to produce the position feedback signal.

7. The system as claimed in claim 6, wherein each magnetic field sensing element is a Hall effect sensor.

8. The system as claimed in claim 1, wherein the system failure is an unexpected loss of electrical power to the actuator assembly.

9. The system as claimed in claim 1, wherein the actuator assembly includes a rotary output shaft and a latch mechanism including a self-locking worm gear drive coupled to the output shaft to convert rotary motion of the output shaft to linear motion.

10. The system as claimed in claim 1, wherein the actuator assembly includes a sector gear coupled to the control member for the selective, small displacement, control member movement.

11. The system as claimed in claim 1, wherein the actuator assembly includes a rotary output shaft and a lead screw flexibly coupled to the output shaft to convert rotary motion of the output shaft to linear motion.

12. The system as claimed in claim 4, wherein the system failure is an unexpected loss of electrical power to the actuator assembly and wherein the actuator assembly includes a failsafe power circuit to controllably store electrical power and supply the stored electrical power to the servomotor in the event of the unexpected loss of electrical power.

13. The system as claimed in claim 2, wherein the system failure is a loss of communication with the remote electronic control unit.

14. An overrunning coupling and electromechanical control assembly comprising:
a coupling subassembly including first and second coupling members having first and second coupling faces, respectively, in close-spaced opposition with one another, at least one of the members being mounted for rotation about a rotary axis;
a control member mounted for controlled shifting movement between the coupling faces;
a bi-directional, electrically-powered, actuator subassembly coupled to the control member for selective, small-displacement, control member movement between different positions which correspond to different operating modes of the coupling subassembly, the actuator subassembly holding the control member in a desired one of the positions after electrical power to the actuator subassembly has been purposefully terminated; and
control logic operative to determine a power or communication failure and to generate a failsafe position command signal in event of the failure, the actuator subassembly moving the control member to a failsafe position between the coupling faces based on the failsafe position command signal to prevent inadvertent engagement of the coupling subassembly.

15. The assembly as claimed in claim 14, wherein the control logic determines the desired position of the control member between the coupling faces based on a command signal received from a remote electronic control unit through a bus.

16. The assembly as claimed in claim 15, wherein the electronic control unit is a transmission electronic control unit of a vehicle and the bus is vehicle-based.

17. The assembly as claimed in claim 14, wherein the actuator subassembly includes a servomotor having an output shaft for driving the control member.

18. The assembly as claimed in claim 17, wherein the actuator subassembly includes at least one non-contact position sensor to provide a position feedback signal as a function of the position of the control member, the control logic controlling the servomotor based on the position feedback signal.

19. The assembly as claimed in claim 18, wherein each sensor includes at least one magnetic or ferromagnetic magnet mounted for movement and at least one magnetic field sensing element disposed adjacent and stationary with respect to the at least one magnet for sensing magnetic flux to produce the position feedback signal.

20. The assembly as claimed in claim 19, wherein each magnetic field sensing element is a Hall effect sensor.

21. The assembly as claimed in claim 14, wherein the failure is an unexpected loss of electrical power to the actuator subassembly.

22. The assembly as claimed in claim 14, wherein the actuator subassembly includes a rotary output shaft and a latch mechanism including a self-locking worm gear drive coupled to the output shaft to convert rotary motion of the output shaft to linear motion.

23. The assembly as claimed in claim 14, wherein the actuator subassembly includes a sector gear coupled to the control member for the selective, small displacement, control member movement.

24. The assembly as claimed in claim 17, wherein the failure is an unexpected loss of electrical power to the actuator subassembly and wherein the actuator subassembly includes a failsafe power circuit to controllably store electrical power and supply the stored electrical power to the servomotor in the event of the unexpected loss of electrical power.

25. The assembly as claimed in claim 15, wherein the failure is a loss of communication with the remote control unit.

26. The assembly as claimed in claim 14, wherein the coupling members are clutch members, the coupling faces are clutch faces and the control member is a selector plate.

27. The assembly as claimed in claim 14, wherein the actuator subassembly includes a rotary output shaft and a lead screw flexibly coupled to the output shaft to convert rotary motion of the output shaft to linear motion.

* * * * *